(12) United States Patent
McBrearty

(10) Patent No.: US 11,442,781 B2
(45) Date of Patent: Sep. 13, 2022

(54) MASTER IMAGE FOR DEPLOYING WORKLOADS IN A HETEROGENEOUS COMPUTING ENVIRONMENT

(71) Applicant: International Business Machines Corporation, Armonk, NY (US)

(72) Inventor: Gerald Francis McBrearty, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 143 days.

(21) Appl. No.: 16/574,439

(22) Filed: Sep. 18, 2019

(65) Prior Publication Data

US 2021/0081247 A1    Mar. 18, 2021

(51) Int. Cl.
| | |
|---|---|
| *G06F 9/50* | (2006.01) |
| *G06F 9/48* | (2006.01) |
| *G06F 8/61* | (2018.01) |
| *G06F 11/30* | (2006.01) |
| *G06F 9/455* | (2018.01) |

(52) U.S. Cl.
CPC ............ *G06F 9/5033* (2013.01); *G06F 8/63* (2013.01); *G06F 9/45533* (2013.01); *G06F 9/4856* (2013.01); *G06F 9/5077* (2013.01); *G06F 9/5083* (2013.01); *G06F 11/3003* (2013.01); *G06F 2009/4557* (2013.01)

(58) Field of Classification Search
CPC ............ G06F 2009/4557; G06F 8/63; G06F 9/45533; G06F 9/5077
See application file for complete search history.

(56) References Cited

U.S. PATENT DOCUMENTS

| | | |
|---|---|---|
| 8,434,081 B2 | 4/2013 | Cervantes |
| 8,443,077 B1 | 5/2013 | Lappas |

(Continued)

OTHER PUBLICATIONS

Diaz-Montes, Javier, et al., FutureGrid Image Repository: A Generic Catalog and Storage System for Heterogeneous Virtual Machine Images. Proceedings—2011 3rd IEEE International Conference on Cloud Computing Technology and Science (Year: 2011).*

(Continued)

*Primary Examiner* — Jorge A Chu Joy-Davila
(74) *Attorney, Agent, or Firm* — Grant M. McNeilly

(57) ABSTRACT

A method for deploying workloads in a heterogenous computing environment having multiple hosts of multiple different types and/or multiple monitors of multiple different types is disclosed. The method includes selecting a master image for deployment of a workload, wherein multiple subimages are associated with the master image, and the subimages correspond to at least some of the different types of hosts and/or the different types of monitors such that the master image is usable to deploy the workload on at least one of the hosts. The method also includes determining a host on which to deploy the workload using the master image; determining a monitor of the host to manage the workload; determining a monitor type of the monitor; determining, by an orchestration engine and based on the monitor type, a subimage that supports the first monitor; and cloning the associated resources to the host to initiate the workload thereon.

20 Claims, 6 Drawing Sheets

(56) References Cited

U.S. PATENT DOCUMENTS

| | | | |
|---|---|---|---|
| 8,799,477 B2* | 8/2014 | Burckart | G06F 9/45533 709/226 |
| 8,850,434 B1* | 9/2014 | Butikofer | G06F 9/5088 718/1 |
| 10,740,217 B1* | 8/2020 | Stupachenko | G06F 9/45558 |
| 2009/0222468 A1* | 9/2009 | Alpern | G06F 16/00 |
| 2011/0078680 A1* | 3/2011 | Lagergren | G06F 9/45558 718/1 |
| 2011/0119662 A1* | 5/2011 | Chen | G06F 11/1004 717/168 |
| 2012/0005672 A1 | 1/2012 | Cervantes | |
| 2012/0110574 A1* | 5/2012 | Kumar | G06F 9/45558 718/1 |
| 2012/0266170 A1* | 10/2012 | Zimmerman | G06F 9/45558 718/1 |
| 2013/0074068 A1* | 3/2013 | Ciano | G06F 8/63 718/1 |
| 2013/0227089 A1 | 8/2013 | Mcleod | |
| 2013/0232484 A1* | 9/2013 | Chieu | G06F 9/45558 718/1 |
| 2013/0275975 A1* | 10/2013 | Masuda | G06F 9/45558 718/1 |
| 2015/0020067 A1* | 1/2015 | Brant | G06F 9/45533 718/1 |
| 2019/0188016 A1 | 6/2019 | Chen | |
| 2019/0334909 A1* | 10/2019 | Schmitt | G06F 3/067 |
| 2020/0241908 A1* | 7/2020 | Dornemann | G06F 11/2094 |
| 2020/0334371 A1* | 10/2020 | Stoler | G06F 21/31 |
| 2021/0055946 A1* | 2/2021 | Golan | G06F 8/63 |

OTHER PUBLICATIONS

"Hypervisors," OpenStack, May 6, 2019, 3 pages. <https://docs.openstack.org/nova/queens/admin/configuration/hypervisors.html>.

Mell et al., "The NIST Definition of Cloud Computing," Recommendations of the National Institute of Standards and Technology, U.S. Department of Commerce, Special Publication 800-145, Sep. 2011, 7 pages.

* cited by examiner

MASTER IMAGE FOR DEPLOYING WORKLOADS IN A HETEROGENEOUS COMPUTING ENVIRONMENT

BACKGROUND

The present invention relates to cloud computing, and more specifically, to a method and apparatus for deploying workloads in a cloud computing environment.

At present, a cloud service can be provided for a customer through a cloud computing environment (also known as a cloud computing platform or a cloud service platform). The cloud computing environment includes a plurality of nodes (or referred to as cloud computing nodes, cloud service nodes, or host servers), each of which has physical resources, such as a central processing unit (CPU), a memory, a disk, and so on. When the customer needs the cloud service (i.e., when the customer needs to use computing resources of the cloud computing environment), the customer sends a request to deploy a workload (e.g., a virtual machine or a container).

SUMMARY

According embodiments of the present disclosure, a method and computer program product for deploying workloads in a heterogenous computing environment having multiple hosts of multiple different types and/or multiple monitors of multiple different types are disclosed. The method and computer program product include selecting a master image for deployment of a workload, wherein multiple subimages are associated with the master image, and the subimages correspond to at least some of the different types of hosts and/or the different types of monitors such that the master image is usable to deploy the workload on at least one of the hosts. The method and computer program product also include determining a host on which to deploy the workload using the master image; determining a monitor of the host to manage the workload; determining a monitor type of the monitor; determining, by an orchestration engine and based on the monitor type, a subimage that supports the first monitor; and cloning the associated resources to the host to initiate the workload thereon.

According embodiments of the present disclosure, a heterogenous computing environment includes an orchestration engine, a first host of a first type that is associated with the orchestration engine, and a second host of a second type that is associated with the orchestration engine, wherein the second type is different from the first type. Also included are a first monitor of a third type that is associated with the first host, a second monitor of a fourth type that is associated with one of the first host and the second host, wherein the fourth type is different from the third type, and a master image associated with the orchestration engine for deploying a workload onto the first monitor or the second monitor, wherein a first subimage is associated with the master image and is compatible with the third type but not the fourth type, and wherein a second subimage is associated with the master image and is compatible with the fourth type of the second monitor but not the third type of the first monitor.

DETAILED DESCRIPTION

Figure 1:
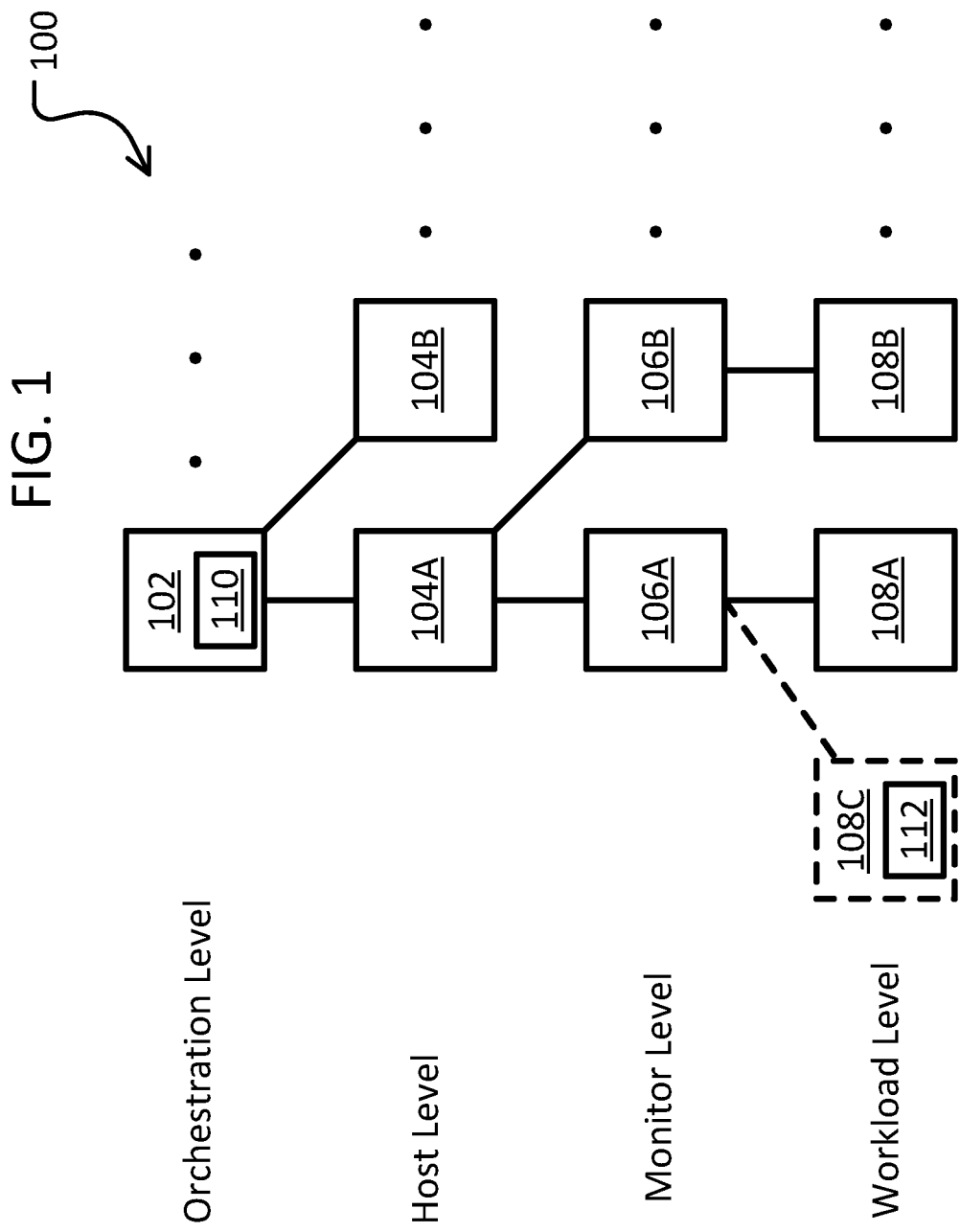
FIG. 1 is a schematic view of a computing environment.

FIG. 1 is a schematic view of computing environment 100. In the illustrated embodiment, computing environment 100 includes orchestration engine 102 at the orchestration level, hosts 104A and 104B (collectively "hosts 104") at the host level that are associated with orchestration engine 102, hypervisor 106A and container manager 106B (collectively "monitors 106") at the monitor level that are associated with hosts 104, respectively, and virtual machine 108A and container 108B (collectively "workloads 108") at the workload level that are associated with monitors 106, respectively. In addition, new workload 108C is positioned at the workload and is depicted in phantom as it is in the process of being configured.

More specifically, new workload 108C can be configured with the computing resources of host 104A and managed by, for example, orchestration engine 102 in communication with hypervisor 106A (because new workload 108C is a virtual machine, but if a new workload were a container, then it can be monitored by orchestration engine 102 in communication with container manager 106B). Thereby, in response to the request for a new workload, physical resources, for example, on host 104A in computing environment 100 are configured in order to deploy new workload 108C on host 104A, and then new workload 108C is provided for the customer to use.

As indicated by the ellipses, there can be more orchestration engines 102, hosts 104, monitors 106, and workloads 108 (and their respective connections) than are depicted in FIG. 1. Furthermore, computing environment 100 can be a heterogeneous environment such that hosts 104 can have different configurations from one another. For example, some of the aspects of hosts 104 that can vary include hardware, firmware, architecture, kernel type, virtualization software, cloud computing software, and/or storage adapter (e.g., fibre channel, InfiniBand, non-volatile memory express, small computer system interface, and internet small computer system interface). Similarly, monitors 106 can have different configurations from one another. For example, some of the aspects of monitors 106 that can vary include architecture, kernel type, virtualization software, cloud computing software, and/or storage adapter (e.g., fibre channel, InfiniBand, non-volatile memory express, small computer system interface, and internet small computer system interface).

New workload 108C can be created using, for example, a boot object such as master image file 110 that is associated with orchestration engine 102. In traditional systems, the correct type of boot object image file should be provided given that there are multiple different types of hardware, software, and cloud technologies available and some are incompatible with each other, for example, in terms of language and/or syntax. Therefore, in order to properly set up workloads in such a heterogeneous computing environment, a large catalogue of conventional image files are maintained to represent all of the various configuration permutations that may arise between hardware, software, and cloud technology. This catalogue of images may be expensive and difficult to create and maintain. However, in accordance with embodiments of the present disclosure, master image 110 has an aggregated collection of multiple sets of instructions (and/or directions thereto) known as "subimages" that are related to at least some (if not all) of the various configuration permutations present in computing environment 100. Thereby, maintenance of a large selection of individual images and selection of the correct one can be avoided.

In the illustrated embodiment, new workload 108C includes the appropriate resources (e.g., files and/or disks) 112 that are directed to be cloned by the corresponding subimage of master image 110. In some embodiments, there is more than one master image 110. In such embodiments, each master image 110 still includes multiple subimages, but each master image 110 can include a different set of subimages from the other master image(s) 110.

Figure 2:
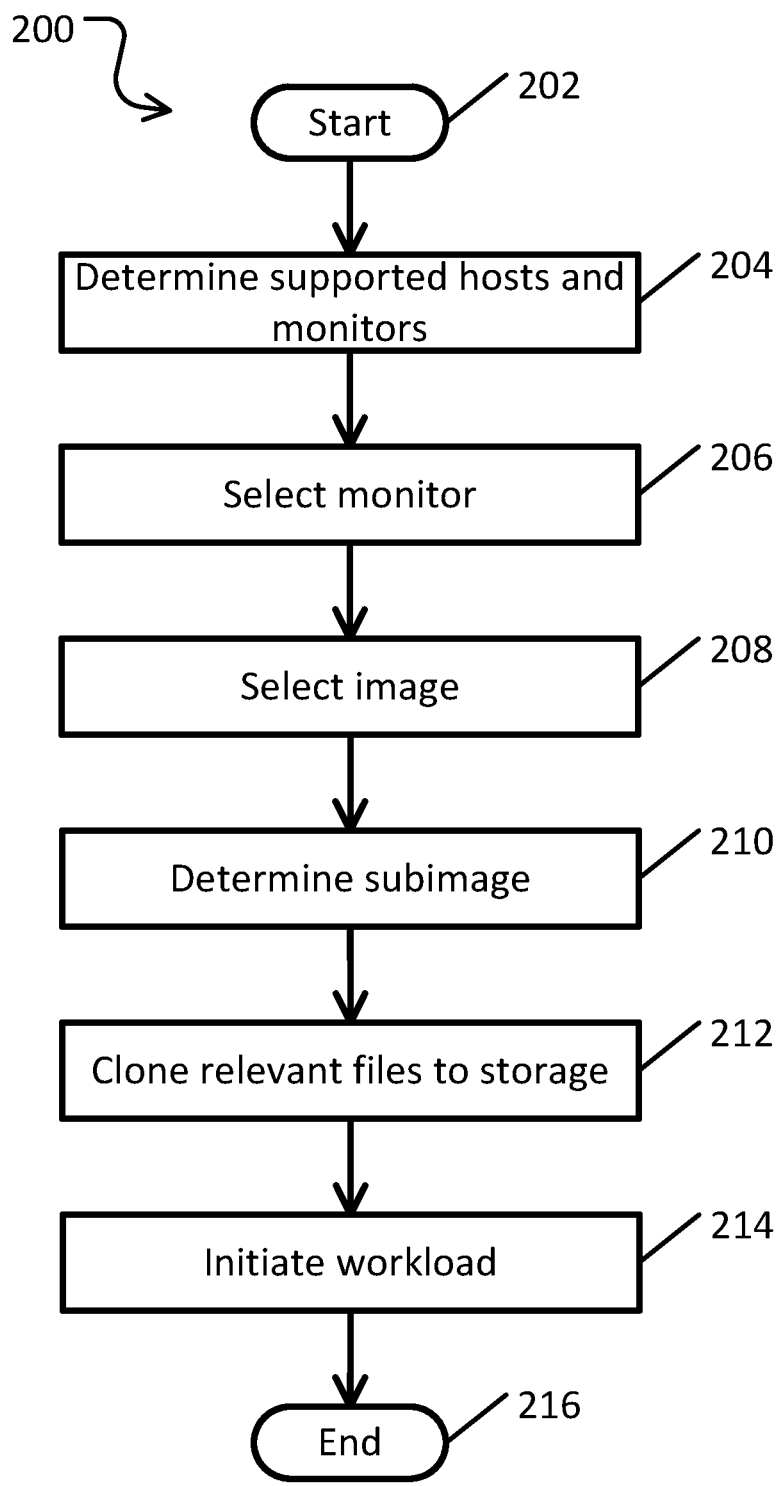
FIG. 2 is a flowchart of a method of deploying a workload using an image.

FIG. 2 is a flowchart of method 200 of deploying new workload 108C using image 110. In the discussion of FIG. 2, references will be made to at least some of the features shown in FIG. 1. Method 200 begins at step 202.

In the illustrated embodiment, at step 204, orchestration engine 102 determines or is informed of which hosts 104 and/or monitors 106 are supported by the available master image (or images) 110. In some embodiments, this can be all hosts 104 and monitors 106, but in other embodiments it can be a subset of hosts 104 and/or monitors 106. At step 206, orchestration engine 102 select a monitor 106 which will manage new workload 108. Step 206 can be performed, for example, using a placement algorithm that is based on, for example the number of available CPUs, the amount of available memory, and/or the amount of volume connectivity of each host 104 and/or monitor 106.

Based on the selection of monitor 106, a master image 110 is selected that is supported by monitor 106 at step 208. At step 210, the types of the selected monitor 106 and/or host 104 are determined, and an appropriate subimage is selected by orchestration engine 102 based on these types. At step 212, relevant resources 212 are cloned to storage according to the selected subimage, for example, by orchestration engine 102. At step 214, new workload 108C is initiated, for example, by orchestration engine 102. At step 216, method 200 ends. While method 200 has been described as initiating a single new workload 108C, method 200 can be used to initiate several new workloads contemporaneously or simultaneously on multiple monitors 106.

Figure 3:
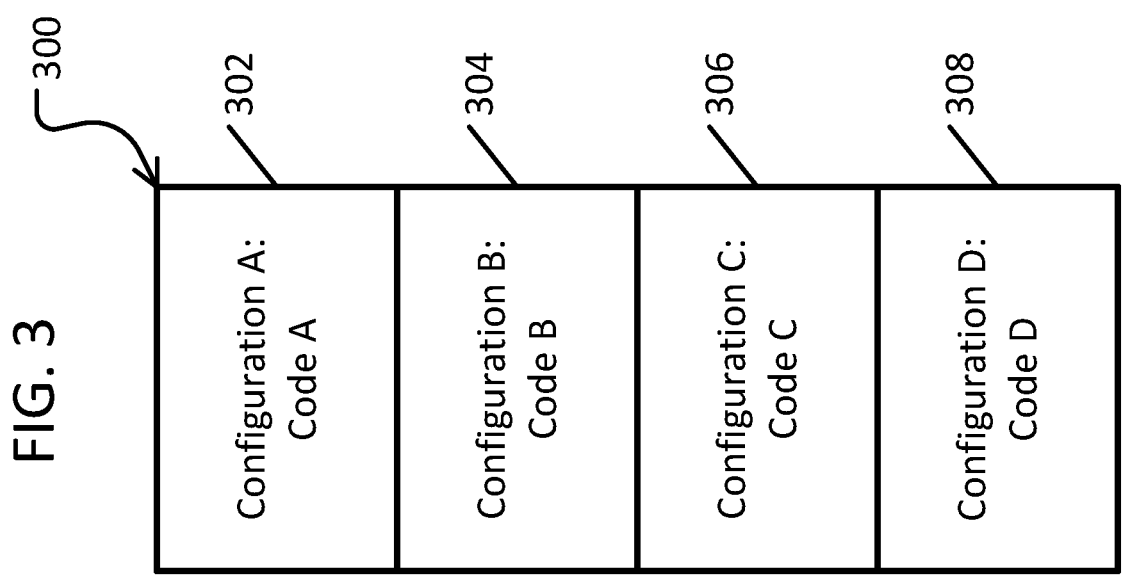
FIG. 3 is a schematic view of an embodiment of an image for initiating the workload.

FIG. 3 is a schematic view of an embodiment of master image 300 for initiating new workload 108C (shown in FIG. 1). Master image 300 can be the same as or similar to master image 110 (shown in FIG. 1). In the illustrated embodiment, master image 300 includes four subimages 302, 304, 306, and 308. Each subimage 302-308 includes the configuration with which it is compatible, as well as the actual code for cloning resources for new workload 108C. An example master image 300 from orchestration engine 102 can appear as follows in the Example Code:
Image {'PowerVM': {'arch': 'ppc64le', 'endian': little, volumes: {'boot': 'vol-a', 'data': 'vol-b'}}, 'PowerVM': {'arch': 'ppc64', 'endian': little, volumes{'boot': 'vol-c', 'data 'vol-d'}}, 'KVM': {'arch': 'ppc64le', 'endian': little, volumes{{'boot': 'vol-f', 'data': 'vol-g'}}, 'vSphere': {'arch': x86, 'endian': little, volumes {'boot': 'vol-h', 'data': 'vol-i'}}}

In the Example Code, each line of code can correspond to one subimage 302-308, respectively. Thereby, master image 300 includes all of the content for all of the subimages 302-308 that are under master image 300.

Figure 4:
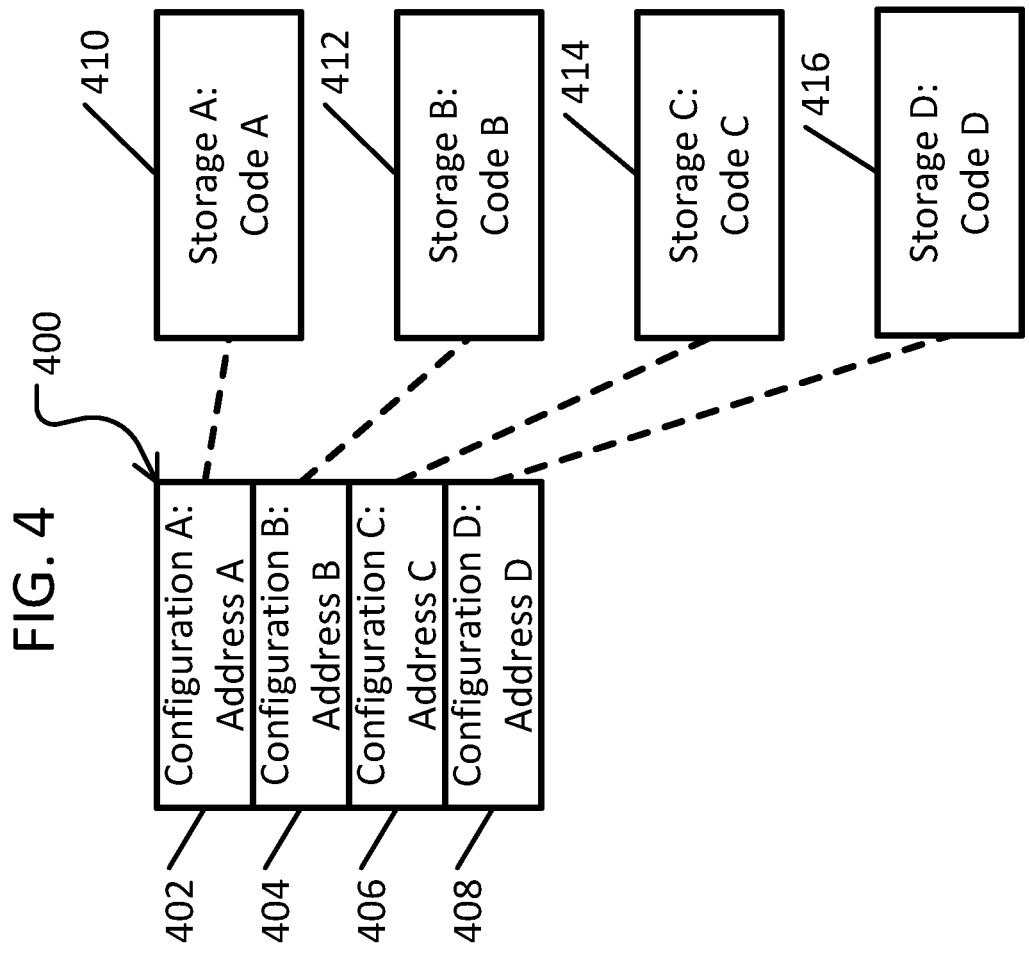
FIG. 4 is a schematic view of an alternate embodiment of an image for initiating the workload.

However, FIG. 4 is a schematic view of an alternate embodiment of master image 400 for initiating new workload 108C (shown in FIG. 1). Master image 400 can be the same as or similar to master image 110 (shown in FIG. 1). In the illustrated embodiment, master image 400 includes four subimages 402-408. Each subimage 402-408 includes the configuration with which it is compatible, as well as an address. This address corresponds to the respective location 410-416 of the actual code for cloning resources for new workload 108C is located. Thereby, master image 400 does not include the actual code for each subimage 402-408 because the actual code is stored in locations 410-416, respectively.

It can be appreciated that some of the embodiments of the present disclosure can provide certain benefits and advantages. For example, using a master image allows a workload to be placed on any of the monitors that are supported by the master image. This can allow a workload to be contemporaneously or simultaneously deployed on multiple monitors that have different (and possibly incompatible) configurations using only a single master image. In addition, a workload can be automatically transferred between otherwise incompatible types of hosts and/or monitors. For example, if there is availability for a workload on one monitor one day and availability for that workload on another monitor the next day. For another example, if a type of host and/or monitor is preferred and/or requested by a user, but that type is not available, the workload can be deployed on another type of host and/or monitor, which avoids postponing the deployment.

Figure 5:
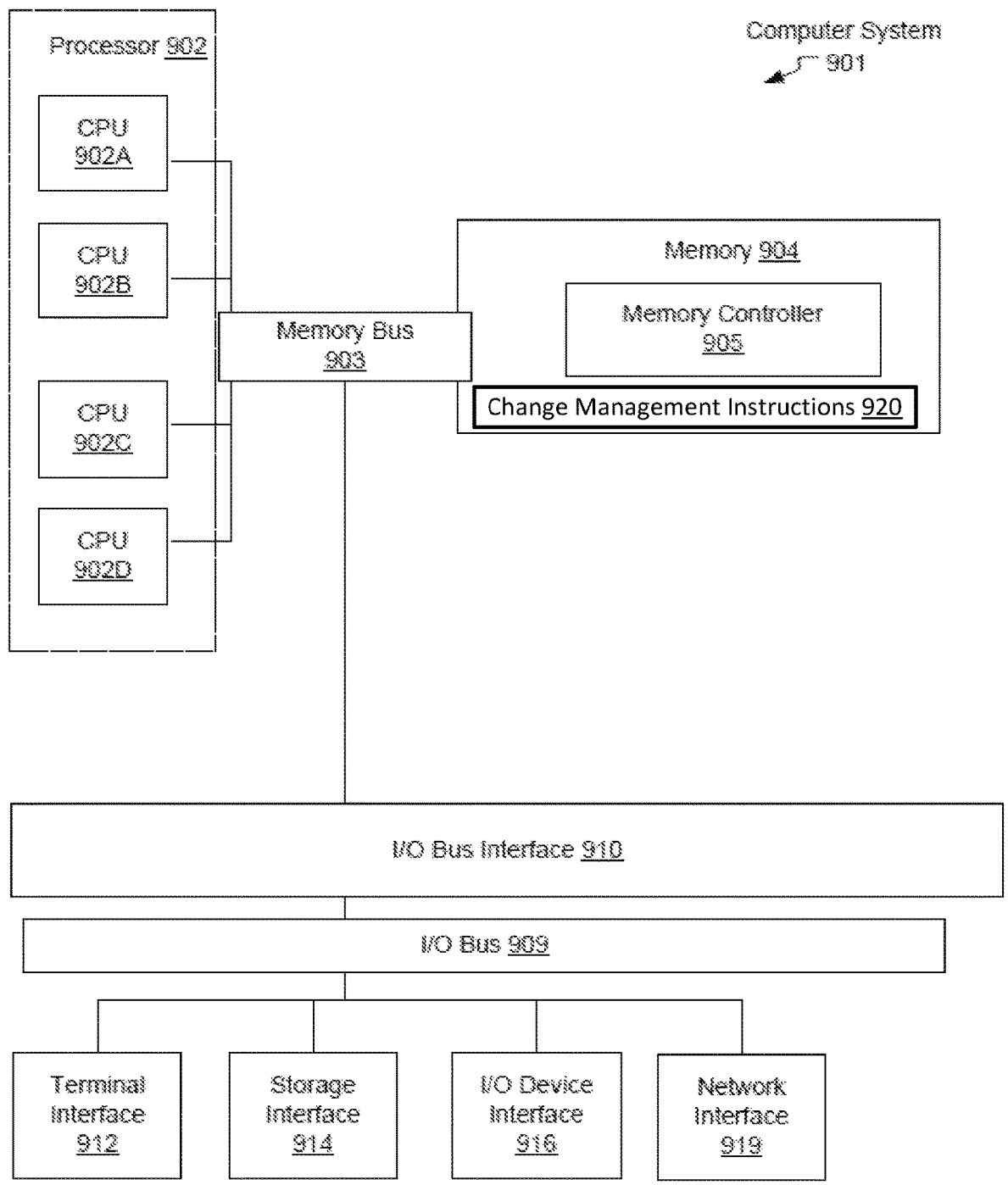
FIG. 5 shows a cloud computing node according to embodiments of the present disclosure.

Referring now to FIG. 5, shown is a high-level block diagram of an example computer system (i.e., computer) 901 that may be used in implementing one or more of the methods or modules, and any related functions or operations, described herein (e.g., using one or more processor circuits or computer processors of the computer), in accordance with embodiments of the present disclosure. In some embodiments, the components of the computer system 901 may comprise one or more CPUs 902, a memory subsystem 904, a terminal interface 912, a storage interface 914, an I/O (Input/Output) device interface 916, and a network interface 919, all of which may be communicatively coupled, directly or indirectly, for inter-component communication via a memory bus 903, an I/O bus 909, and an I/O bus interface unit 910.

The computer system 901 may contain one or more general-purpose programmable central processing units (CPUs) 902A, 902B, 902C, and 902D, herein generically referred to as the processer 902. In some embodiments, the computer system 901 may contain multiple processors typical of a relatively large system; however, in other embodiments the computer system 901 may alternatively be a single CPU system. Each CPU 902 may execute instructions stored in the memory subsystem 904 and may comprise one or more levels of on-board cache.

In some embodiments, the memory subsystem 904 may comprise a random-access semiconductor memory, storage device, or storage medium (either volatile or non-volatile) for storing data and programs. In some embodiments, the memory subsystem 904 may represent the entire virtual memory of the computer system 901 and may also include the virtual memory of other computer systems coupled to the computer system 901 or connected via a network. The memory subsystem 904 may be conceptually a single monolithic entity, but, in some embodiments, the memory subsystem 904 may be a more complex arrangement, such as a hierarchy of caches and other memory devices. For example, memory may exist in multiple levels of caches, and these caches may be further divided by function, so that one cache holds instructions while another holds non-instruction data, which is used by the processor or processors. Memory may be further distributed and associated with different CPUs or sets of CPUs, as is known in any of various so-called non-uniform memory access (NUMA) computer architectures. In some embodiments, the main memory or memory subsystem 904 may contain elements for control and flow of memory used by the Processor 902. This may include a memory controller 905.

Although the memory bus 903 is shown in FIG. 5 as a single bus structure providing a direct communication path among the CPUs 902, the memory subsystem 904, and the I/O bus interface 910, the memory bus 903 may, in some embodiments, comprise multiple different buses or communication paths, which may be arranged in any of various forms, such as point-to-point links in hierarchical, star or web configurations, multiple hierarchical buses, parallel and redundant paths, or any other appropriate type of configuration. Furthermore, while the I/O bus interface 910 and the I/O bus 909 are shown as single respective units, the computer system 901 may, in some embodiments, contain multiple I/O bus interface units 910, multiple I/O buses 909, or both. Further, while multiple I/O interface units are shown, which separate the I/O bus 909 from various communications paths running to the various I/O devices, in other embodiments some or all of the I/O devices may be connected directly to one or more system I/O buses.

In some embodiments, the computer system 901 may be a multi-user mainframe computer system, a single-user system, or a server computer or similar device that has little or no direct user interface but receives requests from other computer systems (clients). Further, in some embodiments, the computer system 901 may be implemented as a desktop computer, portable computer, laptop or notebook computer, tablet computer, pocket computer, telephone, smart phone, mobile device, or any other appropriate type of electronic device.

In the illustrated embodiment, memory subsystem 904 further includes change management instructions 920. The execution of change management instructions 920 enables computer system 901 to perform one or more of the functions described above in managing change requests (for example, method 200, shown in FIG. 2).

It is noted that FIG. 5 is intended to depict representative components of an exemplary computer system 901. In some embodiments, however, individual components may have greater or lesser complexity than as represented in FIG. 5, components other than or in addition to those shown in FIG. 5 may be present, and the number, type, and configuration of such components may vary.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 6:
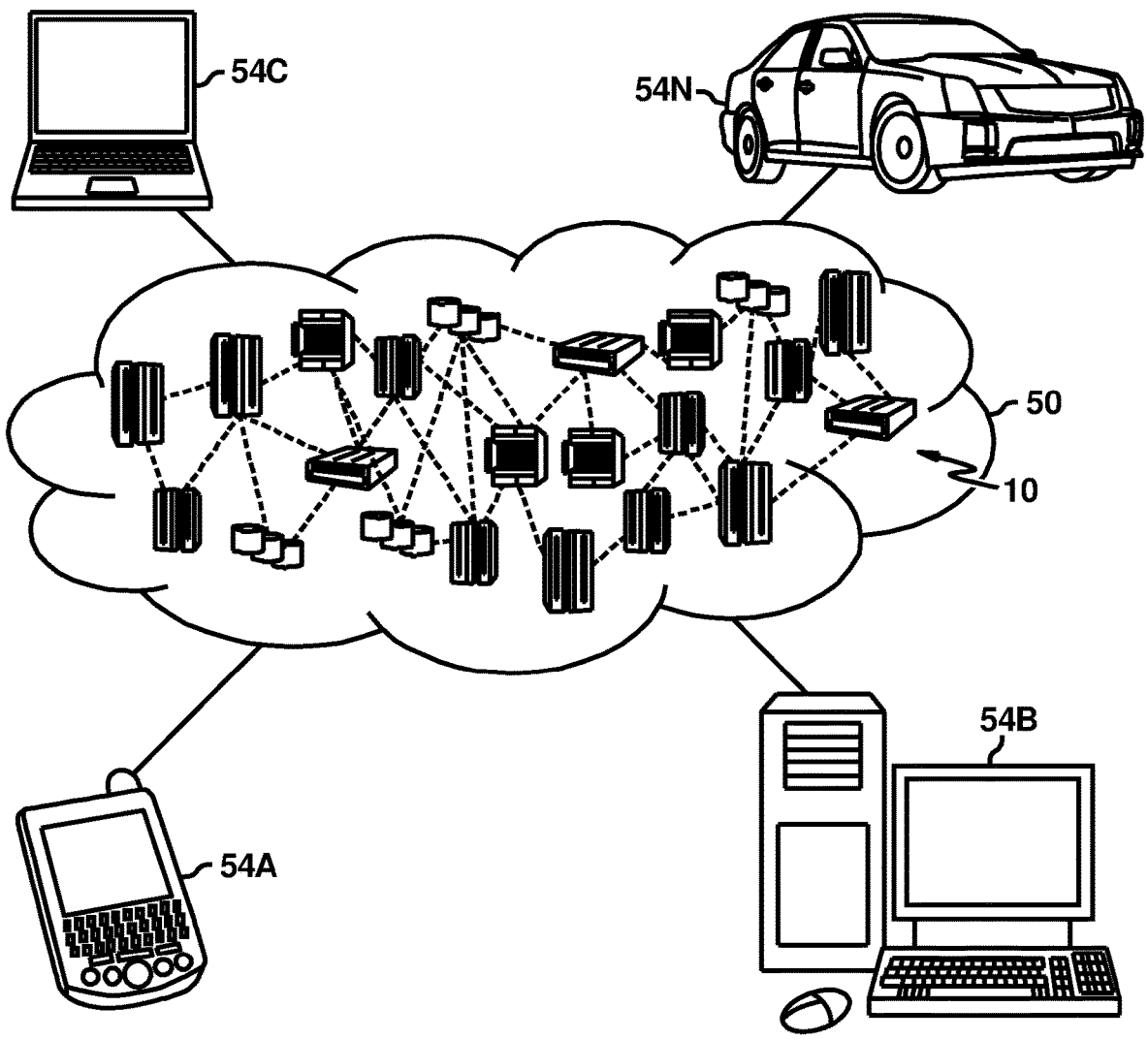
FIG. 6 shows a cloud computing environment according to embodiments of the present disclosure.

Referring now to FIG. 6, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 6 are intended to be illustrative only and that computing nodes 10 and cloud computing environment 50 can communicate with any type of computerized device over any type of network and/or network addressable connection (e.g., using a web browser).

Figure 7:
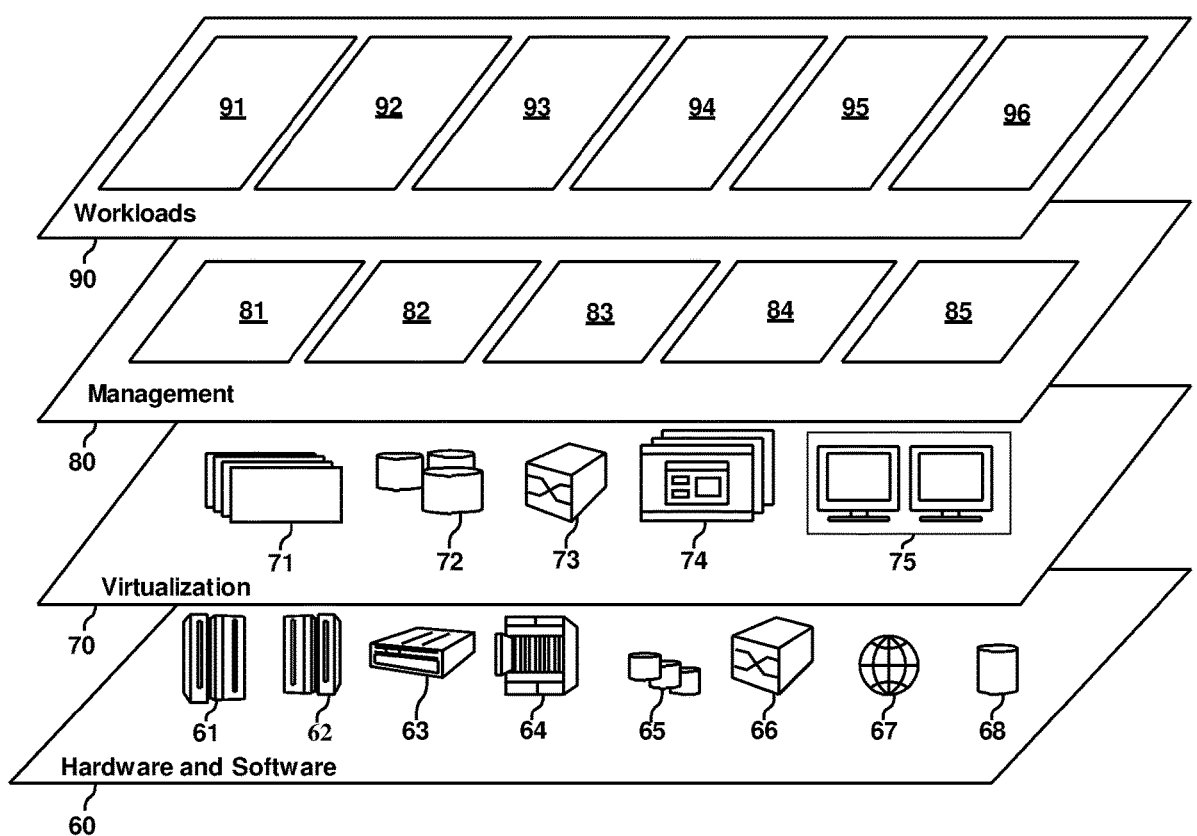
FIG. 7 shows abstraction model layers according to embodiments of the present disclosure.

Referring now to FIG. 7, a set of functional abstraction layers provided by cloud computing environment 50 (FIG. 6) is shown. It should be understood in advance that the components, layers, and functions shown in FIG. 7 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and workload deployment 96.

The descriptions of the various embodiments of the present invention have been presented for purposes of illustration but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method for deploying workloads in a heterogenous computing environment having a plurality of hosts of a plurality of different types and/or a plurality of monitors of a plurality of different types, the method comprising:
    selecting a master image for deployment of a workload, wherein a plurality of subimages are associated with the master image, and the plurality of subimages correspond to at least two of the plurality of different types of hosts and/or the plurality of different types of monitors such that the master image is usable to deploy the workload on at least one of the plurality of hosts, wherein the master image includes a separate address for each of the plurality of subimages;
    determining a first host on which to deploy the workload using the master image;
    determining a first monitor of the first host to manage the workload;
    determining a first monitor type of the first monitor;
    determining, by an orchestration engine and based on the first monitor type, a first subimage of the plurality of subimages that supports the first monitor;
    retrieving code for cloning for the first subimage using the separate address for the first subimage; and
    cloning resources associated with the first subimage to the first host to initiate the workload thereon;
    wherein the plurality of different types is a plurality of different kernel types.

2. The method of claim 1, wherein the workload is a virtual machine.

3. The method of claim 1, wherein the workload is a container.

4. The method of claim 1, further comprising determining which of the plurality of hosts the master image supports.

5. The method of claim 1, wherein the master image includes content of the plurality of subimages.

6. The method of claim 1, wherein the master image includes a separate address for each of the plurality of subimages, and each separate subimage is compatible with a configuration.

7. The method of claim 1, wherein the determining of the first host is performed by the orchestration engine using a placement algorithm that is based on at least one of the group consisting of: a number of available central processing units, an amount of available memory, an amount of volume connectivity of one of the plurality of hosts, and an amount of volume connectivity of one of the plurality of monitors.

8. The method of claim 1, further comprising:
determining a second host on which to deploy the workload using the master image;
determining a second monitor of the second host to manage the workload;
determining a second monitor type of the second monitor; and
determining, by the orchestration engine and based on the second monitor type, a second subimage of the plurality of subimages that supports the second monitor because the first subimage is incompatible with the second monitor type.

9. The method of claim 1, wherein cloning the associated resources to the first host to initiate the workload thereon is based on directions of the first subimage.

10. The method of claim 1, further comprising initiating the workload on the first host.

11. A computer program product comprising a computer readable storage medium having a computer readable program stored therein to deploy workloads in a heterogenous computing environment having a plurality of hosts of a plurality of different types and/or a plurality of monitors of a plurality of different types, wherein the computer readable program, when executed on a computing device, specifically configures the computing device, and causes the computing device to:
select a master image for deployment of a workload, wherein a plurality of subimages are associated with the master image, and the plurality of subimages correspond to at least two of the plurality of different types of hosts and/or the plurality of different types of monitors such that the master image is usable to deploy the workload on at least one of the plurality of hosts, wherein the master image includes a separate address for each of the plurality of subimages;
determine a first host on which to deploy the workload using the master image;
determine a first monitor of the first host to manage the workload;
determine a first monitor type of the first monitor;
determine, based on the first monitor type, a first subimage of the plurality of subimages that supports the first monitor;
retrieve code for cloning for the first subimage using the separate address for the first subimage; and
clone resources associated with the first subimage to the first host to initiate the workload thereon;
wherein the plurality of different types is a plurality of different kernel types.

12. The computer program product of claim 11, wherein the workload is a virtual machine.

13. The computer program product of claim 11, wherein the workload is a container.

14. The computer program product of claim 11, wherein the computer readable program, when executed on the computing device, further specifically configures the computing device, and causes the computing device to determine which of the plurality of hosts the master image supports.

15. The computer program product of claim 11, wherein the master image includes content of the plurality of subimages.

16. The computer program product of claim 11, wherein the master image includes a separate address for each of the plurality of subimages, and each separate subimage is compatible with a configuration.

17. The computer program product of claim 11, wherein the master image is usable to deploy the workload on all of the plurality of hosts.

18. The computer program product of claim 11, wherein the determination of the first host is performed by an orchestration engine using a placement algorithm that is based on at least one of the group consisting of: a number of available central processing units, an amount of available memory, an amount of volume connectivity of one of the plurality of hosts, and an amount of volume connectivity of one of the plurality of monitors.

19. The computer program product of claim 11, wherein the computer readable program, when executed on the computing device, further specifically configures the computing device, and causes the computing device to:
determine a second host on which to deploy the workload using the master image;
determine a second monitor of the second host to manage the workload;
determine a second monitor type of the second monitor; and
determine, based on the second monitor type, a second subimage of the plurality of subimages that supports the second monitor because the first subimage is incompatible with the second monitor type.

20. A heterogenous computing environment comprising:
an orchestration engine;
a first host of a first type that is associated with the orchestration engine;
a second host of a second type that is associated with the orchestration engine, wherein the second type is different from the first type;
a first monitor of a third type that is associated with the first host;
a second monitor of a fourth type that is associated with one of the first host and the second host, wherein the fourth type is different from the third type; and
a master image associated with the orchestration engine for deploying a workload onto the first monitor or the second monitor, wherein a first subimage is associated with the master image and is compatible with the third type but not the fourth type, and wherein a second subimage is associated with the master image and is compatible with the fourth type of the second monitor but not the third type of the first monitor, wherein the master image includes a separate address for each of the first subimage and the second subimage;
wherein the first type, the second type, the third type, and the fourth type are each different virtualization software types; and
wherein the separate addresses are used to retrieve code for cloning the first subimage and the second subimage, respectively.

* * * * *